United States Patent Office 3,062,779
Patented Nov. 6, 1962

3,062,779
VULCANIZED RUBBER STABILIZED WITH ZINC BIS(BENZAMIDAZOYL MERCAPTIDE)
Cornelis Carel de Hilster, Wyandotte, Mich., assignor, by mesne assignments, to Pennsalt Chemicals Corporation, a corporation of Pennsylvania
No Drawing. Filed Apr. 21, 1954, Ser. No. 424,772
3 Claims. (Cl. 260—45.9)

This invention relates to a process for inhibiting ozone attack upon vulcanized rubber and to rubber articles incorporating an inhibitor.

Among the constituents of the atmosphere which are capable of reacting with rubber, only oxygen and ozone produce any perceptible effect at the concentrations in which they are present, and it appears that two separate and distinct processes are responsible for the breakdown of soft vulcanized rubber when exposed to outdoor weathering, i.e., light-energized oxidation and attack by atmospheric ozone.

The quantity of ozone in the atmosphere varies with the atmospheric conditions and the locality. A probable average ozone concentration in the atmosphere is 2.5 parts per hundred million. In some localities, the concentration will be less than this, but in others it may be two or more times as great. In the vicinity of electric motors or other electrical equipment the ozone concentration of the atmosphere may be increased far beyond the concentration usually found therein.

Ozone has a strong destructive action upon vulcanized rubber, both natural and synthetic, this action being especially pronounced when the rubber is stretched. A critical elongation exists, for maximum ozone attack, which varies in accordance with the rubber stock, but it is usually an elongation between 5 and 50 percent.

Ozone in concentrations as low as one part per hundred million will cause checking and crazing of vulcanized rubber in a short time. Over longer periods of time, and at higher ozone concentrations, cracks develop which grow progressively deeper and longer.

One method which has been used for the protection of vulcanized rubber in the past is the application of a film of wax to the rubber after vulcanization, or the incorporation of wax during mixing, so that it blooms to the surface of the rubber article after vulcanization, the most prominent disadvantage of wax protection being that under dynamic flexing conditions, such as would be incurred when a tire is mounted on a car or truck traveling along a highway, the wax film is broken, leaving portions of the tire unprotected.

In accordance with the present invention, it has been found that ozone attack upon synthetic rubber of the butadiene type may be inhibited by the incorporation into the rubber, prior to vulcanization of a class of thioureas having the structure

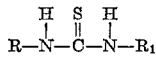

in which R and R₁ are identical and may be alkyl having not in excess of about 6 carbon atoms, cyclohexyl or benzyl radicals.

Exemplary of the thioureas which may be compounded with synthetic rubber of the butadiene type are dibutylthiourea, 1,3-dihexylthiourea, 1,3-di-sec-butylthiourea, 1,3-di-sec-hexylthiourea, 1,3-dibenzylthiourea, and 1,3-dicyclohexylthiourea.

Included within the term "synthetic rubber" of the butadiene type are, for example, homopolymers of butadiene or other monomers, copolymers of butadiene with other polymerizable compounds, such as styrene, divinyl benzene, acrylic and methacrylic acids and their esters, ethylenic hydrocarbons such as ethylene, butylene, iso-butylene and propylene, or with acrylic nitriles or vinyl compounds.

It has also been found, in accordance with the present invention, that dibutylthiourea is an inhibitor of ozone attack upon natural rubber, the term "natural rubber" including the various forms thereof, such as smoked and unsmoked sheet, crepe, and the like.

Both synthetic rubber of the butadiene type and natural rubber may be protected against ozone attack by incorporating zinc bis(benzimidazolyl)mercaptide therein.

In employing the inhibitors of the invention commonly called antiozonants, they may be compounded with either synthetic or natural rubber stocks at any stage prior to vulcanization, in common mixing equipment such as Banbury mixers, mixing rolls, or the like. Generally speaking, the inhibitor may be present in the rubber formulation, either synthetic or natural, in an amount between about 0.1 percent by weight to about 5.0 percent by weight.

The invention will be further illustrated by reference to the following specific example:

EXAMPLE

The ozone inhibitors of the invention were evaluated by subjecting vulcanized rubber strips, containing the various inhibitors to be tested, to an atmosphere of ozone under controlled conditions.

The ozone concentration test employed was essentially the same as that described in A.S.T.M. D1149–51T. The ozone absorbing bottle employed in the test was the same as that described in the aforementioned A.S.T.M. test, and the ozone concentration was determined by electrometric titration with 0.002 N sodium thiosulfate. The test procedure employed differed from the aforementioned A.S.T.M. test in that a higher concentration of ozone was employed, i.e., the ozone concentration was 4.0±0.1 parts per million, which is much higher than the amount proposed in the aforementioned A.S.T.M. test and is also much higher than the concentration of atmospheric ozone, which is about 2.5 parts per hundred million in most parts of the United States.

The inhibitors evaluated were incorporated into both natural rubber and GR–S stocks, having compositions as follows:

Natural Rubber

|  | Parts |
|---|---|
| Smoked sheet | 100 |
| Stearic acid | 3 |
| Zinc oxide | 3 |
| EPC black | 50 |
| Acidic type, pine-gum softener | 3 |
| Sulfur | 2.8 |
| Mercaptobenzothiazole | 1.0 |
|  | 162.8 |

GR–S Black 1

|  | Parts |
|---|---|
| GR–S black 1 | 150 |
| Acidic type, pine-gum softener | 5 |
| Zinc oxide | 5 |
| Sulfur | 2 |
| Mercaptobenzothiazole | 1.6 |
| Diphenylguanidine | 0.1 |
|  | 163.7 |

The amount of ozone inhibitor added to these formulations in each case was 2 parts per 100 parts of rubber.

Rubber specimens measuring 0.5 inch by 0.075 inch by 6 inches were stretched to 12.5 percent elongation for an ozone exposure period of 4 hours. At the end of the 4 hours the number of cracks visible in a ¼ square inch area was counted with the aid of a Linen tester. The number of cracks per ¼ square inch area was taken as the ozone checking index. A control stock was run with each series of inhibitor tests.

A 30-minute cure at a temperature of 280° F. was employed for the ozone tests on natural rubber inhibitors and a 60-minute cure at a temperature of 307° F. was employed for the ozone tests on GR-S inhibitors.

The results of the tests are as follows:

TABLE

*Effect of Ozone on Rubber Vulcanizates*

GR-S FORMULATIONS

| Stock No. | Name of Chemical | Ozone Checking Index |
|---|---|---|
| 1 | None (control stock) | 4-6 |
| 2 | Symmetrical dibutylthiourea | 1-2 |
| 3 | 1,3-dihexylthiourea | 0-0 |
| 4 | 1,3-di-sec-butylthiourea | 1 |
| 5 | 1,3-di-sec-hexylthiourea | 1 |
| 6 | 1,3-dibenzylthiourea | 4 |
| 7 | 1,3-dicyclohexylthiourea | 0 |
| 8 | Zinc bis(benzimidazolyl)mercaptide | 1-0 |

NATURAL RUBBER FORMULATIONS

| | | |
|---|---|---|
| 1 | None (control stock) | 49 |
| 2 | Symmetrical dibutylthiourea | 0 |
| 3 | Zinc bis(benzimidazolyl)mercaptide | 1 |

It will be obvious to those skilled in the art that many modifications may be made within the scope of the present invention without departing from the spirit thereof and the invention includes all such modifications.

I claim:

1. A sulfur vulcanized rubber composition comprising a member selected from the group consisting of natural rubber and butadiene-styrene copolymer rubber and zinc bis (benzimidazoyl mercaptide), the said zinc compound being added in the amount of from 0.1 to 5.0% by weight of the final composition.

2. A sulfur vulcanized rubber composition comprising butadiene-styrene copolymer rubber and zinc bis (benzimidazoyl mercaptide), the said zinc compound being added in the amount of 0.1 to 5.0% by weight of the final composition.

3. A sulfur vulcanized rubber composition comprising natural rubber and zinc (bis benzimidazoyl mercaptide), the said zinc compound being added in the amount of 0.1 to 5.0% by weight of the final composition.

References Cited in the file of this patent

UNITED STATES PATENTS

| | | |
|---|---|---|
| 2,273,995 | Rogerson et al. | Feb. 24, 1942 |
| 2,365,400 | Fikentscher | Dec. 19, 1944 |
| 2,392,041 | Groff | Jan. 1, 1946 |
| 2,444,881 | Sterrett | July 6, 1948 |
| 2,583,370 | Goppel et al. | Jan. 22, 1952 |
| 2,651,623 | Hill et al. | Sept. 8, 1953 |
| 2,766,219 | Beaver et al. | Oct. 9, 1956 |
| 2,849,420 | Stevens et al. | Aug. 26, 1958 |

OTHER REFERENCES

"Modern Synthetic Rubbers," by H. Barron, pub. 1949, p. 19.

Science et Technologie, vol. 29, No. 2 (1952), pages 114–117.

UNITED STATES PATENT OFFICE
CERTIFICATE OF CORRECTION

Patent No. 3,062,779                      November 6, 1962

Cornelis Carel de Hilster

It is hereby certified that error appears in the above numbered patent requiring correction and that the said Letters Patent should read as corrected below.

In the heading to the printed specification, lines 2 and 3, for "VULCANIZED RUBBER STABILIZED WITH ZINC BIS(BENZAMIDAZOYL MERCAPTIDE)" read -- VULCANIZED RUBBER STABILIZED WITH ZINC BIS(BENZIMIDAZOLYL MERCAPTIDE) --; column 2, line 10, for "bis(benzimidazolyl)mercaptide" read -- bis(benzimidazolyl mercaptide) --; column 3, in the table, upper portion, second column, line 8 thereof, same table, lower portion, second column, line 3 thereof, for "Zinc bis(benzimidazolyl)mercaptide", each occurrence, read -- Zinc bis(benzimidazolyl mercaptide) --; column 4, lines 5, 9 and 10, for "benzimidazoyl", each occurrence, read -- benzimidazolyl --; same column, line 14, for "(bis benzimidazoyl" read -- bis(benzimidazolyl --.

Signed and sealed this 30th day of April 1963.

(SEAL)
Attest:
ERNEST W. SWIDER
Attesting Officer

DAVID L. LADD
Commissioner of Patents